United States Patent [19]

Iijima

[11] Patent Number: 4,509,982

[45] Date of Patent: Apr. 9, 1985

[54] INK COMPOSITION FOR WRITING INSTRUMENTS

[75] Inventor: Zenshiro Iijima, Abiko, Japan

[73] Assignee: Adger Kogyo Co., Ltd., Saitama, Japan

[21] Appl. No.: 536,758

[22] Filed: Sep. 28, 1983

[30] Foreign Application Priority Data

Nov. 29, 1982 [JP] Japan ................................ 57-209149
Nov. 29, 1982 [JP] Japan ................................ 57-209148
Jun. 2, 1983 [JP] Japan ................................ 58-98456
Jun. 2, 1983 [JP] Japan ................................ 58-98455

[51] Int. Cl.³ ............................................. C09D 11/00
[52] U.S. Cl. ....................................... 106/23; 106/25; 106/24; 106/308 Q
[58] Field of Search ................. 106/20, 23, 24, 26, 106/25, 308 Q; 206/DIG. 38; 524/4, 424

[56] References Cited

U.S. PATENT DOCUMENTS

| | | | |
|---|---|---|---|
| 2,265,055 | 12/1941 | Biro | 106/24 |
| 3,533,811 | 10/1970 | Clements et al. | 106/24 |
| 3,802,896 | 4/1974 | Westall et al. | 106/24 |
| 3,884,707 | 5/1975 | Dick et al. | 106/24 |
| 4,180,407 | 12/1979 | Gibson et al. | 106/26 |

*Primary Examiner*—Paul Lieberman
*Assistant Examiner*—Amelia B. Yarbrough
*Attorney, Agent, or Firm*—Pahl, Lorusso & Loud

[57] ABSTRACT

An aqueous ink composition useful as a writing ink, including a water-insoluble coloring agent, and a water-soluble polymeric material having a molecular weight of at least about $1 \times 10^5$. Preferably, the polymeric material is a polyethylene oxide or an alginic acid derivative. Ink images drawn on paper using the ink composition may be easily erased by rubbing with a rubber eraser.

5 Claims, No Drawings

INK COMPOSITION FOR WRITING INSTRUMENTS

BACKGROUND OF THE INVENTION

This invention relates to a novel ink composition and, more particularly, the present invention is concerned with an aqueous ink composition for writing instruments affording ink images physically erasable by rubbing with a conventional rubber eraser.

Letters or patterns written on paper with a fountain pen, felt-tip pen or ball-point pen charged with a conventional ink are not physically erasable by means of a rubber eraser. Thus, when correction of such ink images is necessary, it has been a general practice to apply a liquid eraser onto the portion to be corrected so as to effect chemical decoloration thereof, or to apply a correction fluid onto the necessary portion so as to form a white coating thereover. The use of such a liquid eraser and correction fluid is disadvantageous because of possible discoloration of the applied portion and because of the incapability of writing new images immediately after the application of such a liquid or fluid.

SUMMARY OF THE INVENTION

It is, therefore, prime object of the present invention to provide a novel ink composition especially for writing instruments whose written images on paper are easily physically erased by means of rubber or plastic eraser customarily used for pencils.

In accomplishing the above object, there is provided in accordance with the present invention an ink composition comprising:

from 0.1 to 20 wt % of a water-insoluble coloring agent;

from 0.01 to 15 wt % of a water-soluble polymeric material having a molecular weight of at least about $1 \times 10^5$; and from 50 to 90 wt % of water.

Other objects, features and advantages of the present invention will become apparent from the detailed description of the invention which follows.

DETAILED DESCRIPTION OF THE INVENTION

The ink composition of the present invention is characterized by containing a water-insoluble coloring agent dispersed in an aqueous medium having a dissolved polymeric material having a molecular weight of at least about $1 \times 10^5$.

Illustrative of suitable coloring agents are aniline black; carbon black; phthalocyanine pigments such as Phthalocyanine Blue and Phthalocyanine Green; nitroso pigments such as Naphthol Green B; nitro pigments such as Naphthol Yellow S; azo pigments such as Permanent Red FRL, Toluidine Maroon and Hansa Yellow 3R; isoindolinone pigments; vat dye pigments such as Indanthrene Brilliant Orange GK and Monolite Fast Red YS; basic dye pigments such as Victoria Blue Lake; and acid dye pigments such as Quinoline Yellow Lake. As for black pigments, the use of aniline black is preferred for reasons of good erasability and stability of the ink. The amount of the coloring agent in the ink composition is from 0.1 to 20 wt %, preferably from 2 to 10 wt %.

The water-soluble polymeric material serves to prevent the penetration of the ink into the paper and is used in an amount of from 0.01 to 15 wt %. Illustrative of suitable polymeric materials are naturally occurring polymeric materials such as starch, agar, gelatin, dextrin, gum arabic, methylcellulose, casein and an alginic acid derivative; and synthetic polymeric materials such as polyvinyl alcohols, polyethylene oxides, polyvinyl pyrrolidones, polyacrylates, polymethacrylates and polyacrylamides. Above all, the use of polyethylene oxides and/or alginic acid derivatives is preferred because the ink shows a good stability to storage. Preferably, the concentration of the polymeric material is within the range of between 0.05 and 10 wt % in the case of the polyethylene oxide and between 0.05 and 3 wt % in the case of the alginic acid derivative. The molecular weight of the polyethylene oxide is preferably within the range of between $1 \times 10^5$ and $5 \times 10^6$. Illustrative of suitable alginic acid derivatives are alkali metal salts, ammonium salts or esters with alkylene glycols, such as propyl glycol, of alginic acid. Of these, the use of the alginic acid esters is preferred for reasons of stability of the dispersing condition of the ink.

In order to improve the dispersion of the coloring agent in the ink, it is preferable to use a surfactant, generally of a nonionic or anionic type. The concentration of the surfactant in the ink is preferably within the range of between 0.01 and 7 wt %, more preferably between 0.05 and 5 wt %. Illustrative of suitable nonionic surfactants are polyethylene glycol alkyl ethers, fatty acid esters of polyethylene glycols, fatty acid esters of sorbitan, fatty acid esters of glycerin, fatty acid esters of propylene glycol, fatty acid esters of polyoxyethylene sorbitol ethers, fatty acid esters of polyoxyethylene sorbitan ethers, alkyl ethers of polyoxyethylenes, alkyl ethers of polyoxyethylene-polyoxypropylene block polymers and polyoxyethylene alkylamines. Illustrative of suitable anionic surfactants are alkali metal salts of higher fatty acids, alkylphosphates, polyoxyethylene alkyl ether phosphates, alkylsulfonates, alkylarylsulfonic acids, acrylated amino acid salts, alkylsulfates, alkylbenzenesulfonates, alkylnaphthalenesulfonate dialkylsulfosuccinates, polyoxyethylene alkyl ether sulfates and sulfosuccinates.

It is particularly preferred that the polymeric material, especially the polyethylene oxide be used in conjunction with a polyoxyethylene group-containing surfactant. Examples of such surfactants include nonionic surfactants such as fatty acid esters of polyoxyethylene, fatty acid esters of polyoxyethylene sorbitan ethers, fatty acid esters of polyoxyethylene sorbitol ethers, fatty acid esters of polyoxyethylene glycerin ethers, polyoxyethylene alkyl ethers, polyoxyethylene phytosterol ethers, polyoxyethylene castor oil derivatives, polyoxyethylene beeswax derivatives, polyoxyethylene lanoline derivatives, N-polyoxyethylene alkylamines, N-polyoxyethylene fatty acid amide, polyoxyethylene-polyoxypropylene block copolymers, polyoxyethylene alkylphenyl ethers and condensation products of polyoxyethylene nonylphenyl ether and formaldehyde; and anionic surfactants such as polyoxyethylene alkyl ether sulfates (R—$(OCH_2CH_2)_n$—$OSO_3M$), polyoxyethylene alkyl ether acetates and polyoxyethylene alkyl ether phosphates.

When the polyethylene oxide or alginic acid derivative is used as the polymeric material, the ink composition of the present invention may advantageously contain methylcellulose, in order to further improve the stability of the dispersion, i.e. in order to prevent the occurrence of phase separation due to precipitation of solids during storage. The methylcellulose is used preferably in an amount within the range of between 0.002 and 15 wt %, more preferably between 0.005 and 10 wt %, the amount generally varying depending upon the molecular weight thereof.

The ink composition of the present invention may further contain additives such as a thickening agent and a pH control agent, if desired. Examples of the thickening agent include glycerin, alkylene glycols and low molecular weight polyalkylene glycols, such as polyethylene glycol, having a molecular weight within the range of between 200 and 300. The thickening agent is generally used in an amount within the range of between 3 and 40 wt %, preferably between 5 and 30 wt %.

The liquid medium of the ink of the present invention in which the coloring agent is dispersed consists essentially of water. A very small amount of organic solvents such as alcohols may be used as a part of the liquid medium to improve the solubility of components other than the coloring agent. However, the use of the organic solvent may adversely affect the erasability of the ink images because of the increase of the tendency of the resultant ink to penetrate into the paper. Therefore, the organic solvent should not be used in an amount more than 10% based on the water in the ink composition. In this connection, the use of commercially available o/w (oil in water) type pigments should not be used since they contain an organic solvent and an emulsifier. The water content of the ink composition is generally within the range of between 50 and 90 wt %, preferably between 55 and 85 wt %. For reasons of good fluidity of the ink, it is preferred that the viscosity of the ink be within the range of between 1.5 and 70 cps.

The ink composition of the present invention is suitably used as ink for writing instruments such as fountain pens, ball-point pens, felt-tip pens and porous plastic-tip pens. Characters or patterns written on paper with the use of the ink of the present invention may be erased by means of an eraser customarily used for pencils, such as rubber eraser or a plastic eraser.

The following examples further illustrate the present invention.

EXAMPLE 1

1000 g of aniline black were mixed with 1000 g of 1% aqueous methylcellulose solution by means of a ball mill to obtain a first mixture. 10 g of the first mixture were mixed with 50 g of water to obtain a homogeneous dispersion. Another 10 g of the first mixture was mixed with 40 g of a 20% aqueous glycerin solution to obtain a homogeneous dispersion. Further, 20 g of the first mixture were mixed with 100 g of a 1% aqueous solution of polyethylene oxide having a molecular weight of between $1.5 \times 10^5$ and $4 \times 10^5$ to obtain a homogeneous dispersion. Each of the thus obtained inks was charged into a felt-tip pen. Patterns were then written on a paper and the written patterns were erased by means of a commercially available rubber eraser. The ink images were found to be easily erased. No blot was observed when new ink patterns were written on the erased portion.

EXAMPLE 2

1000 g of Phthalocyanine Blue were mixed with 2000 g of a 2 wt % aqueous carboxymethylcellulose solution by means of a ball mill to obtain a second mixture. Using the second mixture in place of the first mixture, Example 1 was repeated in the same manner, whereby the same results were obtained.

EXAMPLE 3

1000 g of Lake Red 4R were mixed with 2300 g of a 1 wt % aqueous solution of a polyethylene oxide having a molecular weight of between $6 \times 10^5$ and $1.1 \times 10^6$ to obtain a third mixture. Example 1 was repeated in the same manner as described except that the third mixture was substituted for the first mixture. The pens with the resulting ink gave the same results with those in Example 1.

EXAMPLE 4

Ink compositions having the formulations shown in Table 1 were prepared by mixing and dispersing respective components. The ink compositions containing surfactants were prepared by first mixing the coloring agent with the surfactant-containing water by means of a mixer before addition of other components. Letters shown in Table 1 mean as follows:

CB: Carbon black (Trademark: CARBON BLACK, manufactured by Mitsubishi Kasei Kogyo K.K., Japan) in an amount of 4 g in Experiments Nos. 1, 2, 3, 7, 8 and 9 and 5 g in other Experiments.

AB: Aniline black (Trademark: DIAMOND BLACK (C.I. 50440, manufactured by BASF, Germany) in an amount of 10 g.

PEO-I: Polyethylene oxide (molecular weight: $10^5$–$2.5 \times 10^5$, 5% aqueous solution) in the amount shown in Table 1.

PEO-II: Polyethylene oxide (molecular weight: $0.6 \times 10^6$–$1.1 \times 10^6$, 1% aqueous solution) in the amount shown in Table 1.

MC-I: Methylcellulose (Trademark: MARPOLOSE M-25, manufactured by Matsumoto Yushi Seiyaku K.K., Japan, 1% aqueous solution) in an amount of 3 g.

MC-II: Methylcellulose (Trademark: MARPOLOSE #M-400, manufactured by Matsumoto Yushi Seiyaku K.K., Japan, 1% aqueous solution) in an amount of 3 g in Experiments Nos. 37 and 41, and 5 g in Experiments Nos. 36, 38, 40 and 42.

CMC: Carboxymethylcellulose (1% aqueous solution).

SA-I: Polyoxyethylene alkyl ether phosphate.

SA-II: Polyoxyethylene alkylphenyl ether.

SA-III: Polyoxyethylene-polyoxypropylene block polymer (Tradename: L-64, manufactured by Asahidenka Kogyo K.K.).

SA-IV: Polyoxyethylene alkylamine.

SA-V: Condensation product of naphthalenesulfonic acid and formaldehyde.

SA-VI: Fatty acid ester of glycerin.

SA-VII: Alkylsulfosuccinate.

SA-VIII: Polyoxyethylene alkyl ether.

GL: Glycerin in an amount of 10 g.

ALG-Na: Sodium salt of alginic acid (1% aqueous solution) in the amount shown in Table 1.

ALG-PG: Alginic acid ester of propylene glycol (1% aqueous solution) in the amount shown in Table 1.

SA-I to SA-VIII were each used in an amount of 0.5 g.

The ink compositions were each charged in a felt tip pen and patterns were written on a paper with the pen. The pens showed a good ink fluidity and clear ink images were obtained. After drying, the written patterns were rubbed by means of a commercially available eraser (Trademark: PLASTIC ERASER PE-03, manufactured by Tombow Co., Ltd., Japan) to examine their erasability. The written patterns were found to be erased completely. Next, to examine the stability of each ink to storage, each pen was capped and stood in the vertical position with its pen tip upward for 60 days. Patterns were then written with the resulting pens for evaluating their image density. The stability to storage was rated in accordance with the following ratings of the change of the image density in comparison with that before the storage. The change in image density is caused due to the change in the dispersing condition of the coloring agents.

A: No change
B: Very slight decrease
C: Slight decrease
D: Definite decrease
E: Considerable decrease, unsuited for practical use The results were as shown in Table 1. The ink images written with the pens after storage were found to be erased completely by means of the aforementioned eraser.

TABLE 1

| Experiment No. | Coloring agent | Polymeric material (amount (g)) | Additive | Amount of water (g) | Stability |
|---|---|---|---|---|---|
| 1 | CB | PEO-I (50) | — | 50 | C |
| 2 | CB | PEO-I (50) | GL | 40 | C |
| 3 | CB | PEO-I (50) | SA-III, GL | 39.5 | B |
| 4 | AB | PEO-I (50) | — | 50 | C |
| 5 | AB | PEO-I (50) | GL | 40 | C |
| 6 | AB | PEO-I (50) | SA-III, GL | 39.5 | B |
| 7 | CB | PEO-II (30) | — | 70 | C |
| 8 | CB | PEO-II (30) | GL | 60 | C |
| 9 | CB | PEO-II (30) | SA-III, GL | 59.5 | B |
| 10 | AB | PEO-II (30) | GL | 60 | C |
| 11 | CB | ALG-PG (50) | — | 50 | C |
| 12 | CB | ALG-PG (50) | GL | 40 | C |
| 13 | CB | ALG-PG (50) | SA-III, GL | 39.5 | C |
| 14 | CB | ALG-PG (50) / PEO-I (20) | GL | 20 | C |
| 15 | CB | ALG-PG (50) / PEO-I (20) | SA-III, GL | 19.5 | B |
| 16 | CB | ALG-Na (50) | GL | 40 | C |
| 17 | CB | ALG-Na (50) | SA-III, GL | 39.5 | C |
| 18 | CB | ALG-Na (50) / PEO-I (20) | GL | 20 | C |
| 19 | CB | ALG-Na (50) / PEO-I (20) | SA-III, GL | 19.5 | C |
| 20 | AB | ALG-PG (50) | GL | 40 | C |
| 21 | AB | ALG-PG (50) | SA-III, GL | 39.5 | B |
| 22 | AB | ALG-PG (50) / PEO-I (20) | GL | 20 | C |
| 23 | AB | ALG-PG (50) / PEO-I (20) | SA-III, GL | 19.5 | B |
| 24 | AB | ALG-Na (50) / PEO-I (20) | GL | 20 | C |
| 25 | AB | ALG-Na (50) | SA-III, GL | 39.5 | C |
| 26 | AB | ALG-Na (50) / PEO-I (20) | GL | 20 | C |
| 27 | AB | ALG-Na (50) / PEO-I (20) | SA-III, GL | 19.5 | C |
| 28 | CB | ALG-PG (50) / PEO-II (20) | SA-III, GL | 19.5 | B |
| 29 | CB | ALG-Na (50) / PEO-II (20) | SA-III, GL | 19.5 | C |
| 30 | AB | ALG-PG (50) / PEO-II (20) | SA-III, GL | 19.5 | B |
| 31 | AB | ALG-Na (50) / PEO-II (20) | SA-III, GL | 19.5 | C |
| 32 | CB | MC-I (40) | GL | 50 | D |
| 33 | CB | CMC (40) | GL | 50 | D |
| 34 | AB | MC-I (40) | GL | 50 | D |
| 35 | AB | CMC (40) | GL | 50 | D |
| 36 | AB | PEO-I (25) | MC-II, SA-VIII, GL | 59.5 | A |
| 37 | AB | PEO-I (40) | MC-II, SA-III, GL | 46.5 | A |
| 38 | AB | PEO-II (25) | MC-II, SA-VIII, GL | 59.5 | A |
| 39 | AB | PEO-II (30) | MC-I, SA-III, GL | 56.5 | A |

TABLE 1-continued

| Experiment No. | Coloring agent | Polymeric material (amount (g)) | Additive | Amount of water (g) | Stability |
|---|---|---|---|---|---|
| 40 | CB | PEO-I (25) | MC-II, SA-I, GL | 59.5 | A |
| 41 | CB | PEO-I (40) | MC-II, SA-VIII, GL | 46.5 | A |
| 42 | CB | PEO-II (25) | MC-II, SA-III, GL | 59.5 | A |
| 43 | CB | PEO-II (30) | MC-I, SA-VIII, GL | 56.5 | A |
| 44 | AB | PEO-I (50) | SA-I, GL | 39.5 | B |
| 45 | AB | PEO-I (50) | SA-VIII, GL | 39.5 | B |
| 46 | AB | PEO-II (30) | SA-III, GL | 59.5 | B |
| 47 | AB | — | MC-I, SA-VIII, GL | 49.5 | D |
| 48 | CB | PEO-I (50) | SA-I, GL | 39.5 | B |
| 49 | CB | PEO-II (50) | SA-VIII, GL | 39.5 | B |
| 50 | CB | PEO-II (30) | SA-III, GL | 59.5 | B |
| 51 | CB | — | MC-I, SA-VIII, GL | 49.5 | D |
| 52 | AB | PEO-I (40) | SA-I, GL | 49.5 | B |
| 53 | AB | PEO-I (40) | SA-II, GL | 49.5 | B |
| 54 | AB | PEO-I (50) | SA-IV, GL | 39.5 | B |
| 55 | CB | PEO-I (40) | SA-I, GL | 49.5 | B |
| 56 | CB | PEO-I (40) | SA-II, GL | 49.5 | B |
| 57 | CB | PEO-I (50) | SA-III, GL | 39.5 | B |
| 58 | CB | PEO-I (50) | SA-IV, GL | 39.5 | B |
| 59 | AB | PEO-I (50) | GL | 40.0 | C |
| 60 | AB | PEO-I (50) | SA-V, GL | 39.5 | C |
| 61 | AB | PEO-I (50) | SA-VI, GL | 39.5 | C |
| 62 | AB | PEO-I (50) | SA-VII, GL | 39.5 | C |
| 63 | CB | PEO-I (50) | GL | 40.0 | C |
| 64 | CB | PEO-I (50) | SA-V, GL | 39.5 | C |
| 65 | CB | PEO-I (50) | SA-VI, GL | 39.5 | C |
| 66 | CB | PEO-I (50) | SA-VII, GL | 39.5 | C |

EXAMPLE 5

Example 1 was repeated using blue, green, red and yellow pigments in place of the black pigments to obtain ink compositions as shown in Table 2. In Table 2, similar letters have the same meaning as in Table 1 and the letters PCB, PCG, PR and NY mean Phthalocyanine Blue, Phthalocyanine Green, Permanent Red FRL and Naphthol Yellow S, respectively. The ink compositions were each charged in a felt tip pen and patterns were written on a paper with the pen. The written patterns, after drying, were found to be erased completely by the same eraser as used in Example 1.

TABLE 2

| Experiment No. | Pigment[*1] | Polymeric material (amount (g)) | Surfactant[*2] | Amount of MC-II | Amount of GL | Amount of Water |
|---|---|---|---|---|---|---|
| 61 | PCB | PEO-I (15) | SA-II | — | 15 | 64.5 |
| 62 | PCG | PEO-I (15) | SA-II | — | 15 | 64.5 |
| 63 | PR | PEO-I (15) | SA-II | — | 15 | 64.5 |
| 64 | NY | PEO-I (15) | SA-II | — | 15 | 64.5 |
| 65 | PCB | PEO-I (15) | SA-IV | 6 | 15 | 58.5 |
| 66 | PCG | PEO-I (15) | SA-IV | 6 | 15 | 58.5 |
| 67 | PR | PEO-I (15) | SA-IV | 6 | 15 | 58.5 |
| 68 | NY | PEO-I (15) | SA-IV | 6 | 15 | 58.5 |
| 69 | PCG | PEO-I (15) / ALG-PG (5) | SA-II | — | 15 | 59.5 |
| 70 | PR | PEO-I (15) / ALG-PG (5) | SA-II | — | 15 | 59.5 |
| 71 | PCG | PEO-I (15) / ALG-PG (5) | SA-IV | 5 | 15 | 54.5 |
| 72 | PR | PEO-I (15) / ALG-PG (5) | SA-IV | 5 | 15 | 54.5 |

[*1]: Used in an amount of 5 g.
[*2]: Used in an amount of 0.5 g.

I claim:

1. An ink composition comprising: 0.1 to 20 wt % of a water-insoluble coloring agent; 0.05 to 10 wt % of a water-soluble polymeric material which is a polyethylene oxide having a molecular weight of between about $1 \times 10^5$ and $5 \times 10^6$; 0.5 to 5 wt % of a nonionic or anionic surfactant having a polyoxyethylene group; and 50 to 90 wt % water.

2. A composition as set forth in claim 1, further comprising methylcellulose.

3. A composition as set forth in claim 2, further comprising a thickening agent selected from the group consisting of glycerin, a polyalkylene glycol having a molecular weight of 200 to 300 and an alkylene glycol.

4. A composition as set forth in claim 1, wherein the coloring agent is carbon black or aniline black.

5. A writing instrument holding an ink composition according to claim 1.